United States Patent [19]

Matsuno

[11] 4,196,965
[45] Apr. 8, 1980

[54] CONNECTING METHOD OF OPTICAL FIBER WITH PLASTIC CLAD

[75] Inventor: Koichiro Matsuno, Yokohama, Japan

[73] Assignee: Sumitomo Electric Industries, Ltd., Osaka, Japan

[21] Appl. No.: 875,487

[22] Filed: Feb. 6, 1978

[30] Foreign Application Priority Data

Feb. 11, 1977 [JP] Japan .................. 52-14395

[51] Int. Cl.² ............................................. G02B 5/14
[52] U.S. Cl. .............................................. 350/96.21
[58] Field of Search ............... 350/96.20, 96.21, 96.22

[56] References Cited

U.S. PATENT DOCUMENTS

| 3,579,316 | 5/1971 | Dyott et al. | 350/96.21 |
| 3,904,269 | 9/1975 | Lebduska et al. | 350/96.22 |
| 3,914,015 | 10/1975 | McCartney | 350/96.22 |
| 4,049,414 | 9/1977 | Smith | 350/96.21 |

FOREIGN PATENT DOCUMENTS 2312791 12/1976 France .................. 350/96.21

*Primary Examiner*—Stewart J. Levy
*Attorney, Agent, or Firm*—Sughrue, Rothwell, Mion, Zinn and Macpeak

[57] ABSTRACT

A pair of optical fibers each having a core and a plastic clad is connected end to end by removing end portions of the plastic clads to expose end portions of the cores of the fibers, and contacting the end portions of the cores so that the optical axis of one fibers. The contacting portion of the fibers are connected by heat melting. The connecting portion of the fibers are covered with a melting, and covering the connecting portion of the fibers with a protection sleeve composed of an inner plastic layer having a refractive index smaller than that of the core and an outer metal layer and having an inner diameter substantially equal to an outer diameter of the optical fiber. The ends of the sleeve are sealingly connected onto the outer surfaces of the optical fibers, respectively.

3 Claims, 7 Drawing Figures

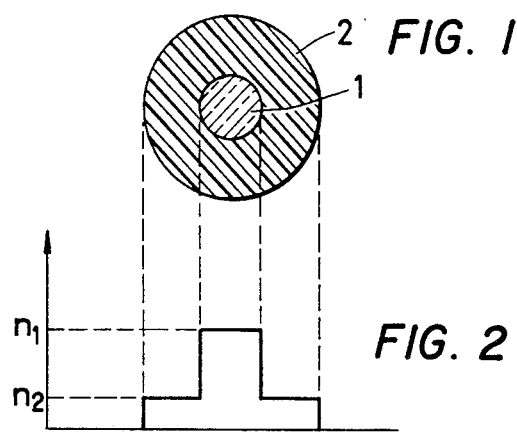
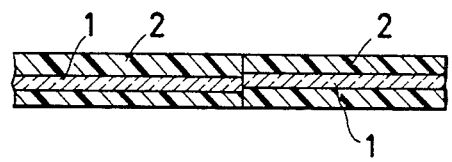

CONNECTING METHOD OF OPTICAL FIBER WITH PLASTIC CLAD

BACKGROUND OF THE INVENTION

The prior art is replete with various optical fiber structures. One is a plastic clad fiber having a cross section shown in FIG. 1 in which reference numeral 1 designates a core and 2 a clad or sheath portion made of resin containing fluorine or silicon. FIG. 2 shows a refractive index distribution of the section of the optical fiber in FIG. 1. Refractive indexes of the core 1 and the clad or sheath 2 are $n_1$ and $n_2$, respectively. The relation of $n_1 > n_2$ is established and almost all of the optical energy within the fiber is transmitted through the core 1. In connecting such optical fibers, there are various factors detriorating the optical transmission efficiency. The primary factor is radial displacement of the optical axes of the fibers in connecting thereto. Many methods of connecting the optical fibers with a high transmission efficiency has been heretofore proposed. In these methods, the outer peripheral surface of the clad 2 is utilized as a fundamental or base to utilize the optical fibers. For this reason, if the core is eccentrically disposed in the clad 2 or the thickness of the clad 2 is nonuniform, the cores are displaced as shown in FIGS. 3 and 4. As the result, the optical transmission efficiency is greatly reduced around the connecting portion.

SUMMARY OF THE INVENTION

An object of the present invention is to provide a method of connecting optical fibers by which the above mentioned defect is eliminated. Another object of the present invention is to facilitate the fiber connecting while maintaining optical transmission efficiency.

BRIEF DESCRIPTION OF THE DRAWINGS

In the drawings:

FIG. 1 is a cross-sectional view of a typical example of optical fibers;

FIG. 2 is a diagram of optical fiber refractive index distribution of the optical fiber in FIG. 1;

FIGS. 3 and 4 illustrate section examples of connection of optical fibers performed on the basis of an alignment of outer surfaces of the optical fibers, respectively;

DETAILED DESCRIPTION OF THE INVENTION

Figure 5:
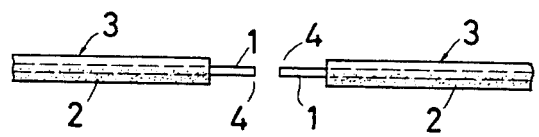
FIG. 5 shows the first step of the present invention for connecting optical fibers.
Figure 6:
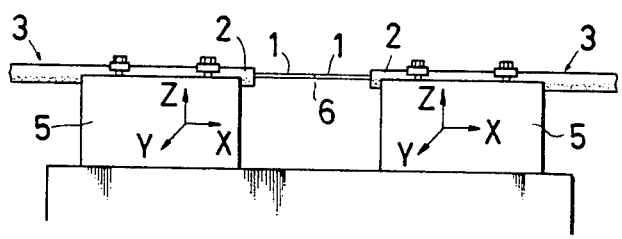
FIG. 6 shows the second step of the present method.

Referring to FIG. 5, end portions 4 of clads 2 of two fibers 3 to be connected are removed to expose end portions of core 1 thereof. Thereafter, end faces of the end portion of the cores 1 are made perpendicular to the optical axis thereof and desirably polished, respectively. Next, the two fibers 3 are set on a pair of three-dimensional inching devices 5, respectively, as shown in FIG. 6. In the next step, the centering of the cores 1 of two fibers 3 is performed by adjusting the inching devices 5 and, at the same time, the end faces of the cores 1 are abutted face to face. In order to assure a precise centering of the optical fibers 3, it is advisable to use a microscope or to do the centering with a laser beam passing through the cores 1. After the above mentioned centering step, the abutting portion 6 of the cores 1 is melted by arc discharge to connect the end faces of the cores.

The connecting portion having no clad, i.e., the exposed portion of the optical fiber is mechanically very weak. Therefore, it is necessary to reinforce this portion. In order to reinforce the connecting portion, it is possible to provide a clad material having the same refractive index as the core on the connecting portion, the thickness being substantially equal to that of the clad of the optical fiber and then cover the portion with a suitable reinforcement sleeve. This reinforcement is effective and the refractive index of the reinforcement sleeve can be any value. This method is, however, time consuming and workability is very low due to the necessity of provisions of the clad material.

According to the present invention, the necessity of provision of the clad material is eliminated by suitably selecting the material of the sleeve. That is, the connecting portion of the core is reinforced by a reinforcement sleeve which has a refractive index lower than that of the core 1 so that the laser beam transmitted through the optical fiber does not come outside. Unless the reinforcement sleeve is made of a material having a suitable refractive index, the transmission efficiency of the fiber is reduced.

Figure 7:
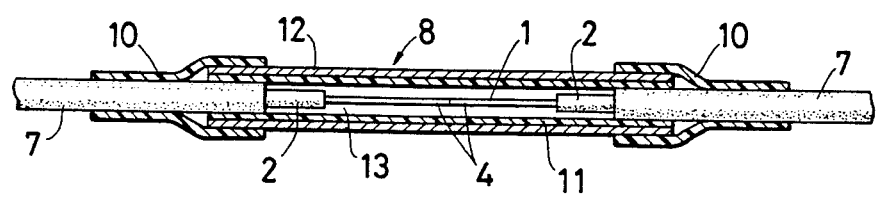
FIG. 7 shows the last step of the present method.

A preferred embodiment of the reinforcement of the connecting portion according to the present invention is shown in FIG. 7. A reinforcement layer 7 is provided around the clad 2 of the optical fibers as usual. The connecting portion of the core 1 is covered with a protection sleeve 8 an inner diameter of which is substantially equal to an outer diameter of the reinforcement layer 7. The protection sleeve 8 is sealingly secured at its ends onto reinforcement layer 7 by shrinkage of thermally shrinkable tubes 10. Of course, the tubes 10 and the sleeve 8 are passed to the optical fibers prior to the connecting works of the optical fibers. The sleeve 8 is composed of an inner layer 11 and an outer layer 12. The inner layer 11 is made of fluorine containing resin a refractive index of which is smaller than that of the core 1 while the outer layer 12 is made of metal. By use of the sleeve 8, the transmission efficiency of the fiber is not detriorated since the connecting portion 4 of the core 1 is disposed in air which has a refractive index of 1 and the length of the portion 4 is negligible in comparison with the overall length of the optical fiber. Even if the core 1 is in contact with the surface of the inner layer 11 of the sleeve 8 when the optical fiber is bent, the transmission efficiency is also not detriorated at all since the inner layer 11 is made of a fluorine containing resin which have smaller refractive index than that of the core 1. Further, in view of the mechanical strength, the reinforced connecting portion according to the present invention is very strong against the tension and bending forces since the outer layer 12 is made of metal and the ends of the sleeve 8 are secured to the reinforcement members 7 by the shrinkable tubes 10.

In FIG. 7, the inner layer 11 may be made of a silicon containing resin. Alternatively, the sleeve 8 may be a single layered structure.

The connecting between the sleeve 8 and the reinforcement layer 7 may also be achieved by use of adhesive agent instead of the thermally shrinkable tubes. A space 13 defined by the sleeve 8 and the connecting portion of the fibers may be filled with a resin having refractive index less than that of the core 1.

While the invention has been described in detail and with reference to a specific embodiment thereof, it will be apparent to one skilled in the art that various changes and the modifications can be made therein without departing from the spirit and scope thereof.

What is claimed is:

1. A method of the connection of a pair of optical fibers each having a core and a plastic layer, comprising the steps of:
   (a) removing portions of the plastic clad layers from the ends of the fibers to be connected to expose end portions of the cores of the fibers,
   (b) contacting the ends of the cores exposed so that optical axes of the fibers are in alignment,
   (c) connecting the contacting portion of the cores by heat melting, and
   (d) covering the exposed portions of the cores with a sleeve composed of a lamination of an inner layer and an outer layer having refractive index smaller than that of the core and having an inner diameter substantially equal to the outer diameter of the fiber.

2. A method claimed in claim 1, wherein said inner layer of said sleeve is made of a resin containing silicon.

3. A method claimed in claim 1, wherein said sleeve has a a metal outer layer.

* * * * *